United States Patent [19]

Ebner

[11] 4,092,702
[45] May 30, 1978

[54] FONT SEGMENT FRONT LOADING DEVICE

[75] Inventor: Peter R. Ebner, South Nashua, N.H.

[73] Assignee: Itek Corporation, Lexington, Mass.

[21] Appl. No.: 778,754

[22] Filed: Mar. 17, 1977

[51] Int. Cl.² .................. G03B 17/06; G03B 17/10; G03B 17/18

[52] U.S. Cl. .................................. 354/15; 354/19

[58] Field of Search .................. 354/12–15, 354/18, 19, 292

[56] References Cited

U.S. PATENT DOCUMENTS

| 3,678,819 | 7/1972 | Gruber .................. 354/15 X |
| 3,821,770 | 6/1974 | Rosenstein et al. .................. 354/292 |
| 3,886,566 | 5/1975 | Moyroud et al. .................. 354/15 |
| 4,015,273 | 3/1977 | Linde et al. .................. 354/15 |

Primary Examiner—John Gonzales
Attorney, Agent, or Firm—Homer O. Blair; Robert L. Nathans

[57] ABSTRACT

A plurality of outwardly and radially extending font segment support arms are coupled to a central hub which is rotated to sequentially present the letters formed upon the segments to an optical imaging station which selectively projects optical images of the letters upon a photosensitive medium. Vertical shoulder portions are precision machined upon outer portions of the radially extending support members for precisely positioning the arcuate character tracks on the segments with respect to the imaging station. Horizontal plates are affixed to the radially extending support members to support the segments against gravity and centrifugal force is employed to precisely seat the segments against the vertically oriented shoulder portions upon rotation of the hub. A stationary stage plate together with a ramp element provide for easy and rapid insertion and removal of font segments from the front of the phototypesetter.

12 Claims, 4 Drawing Figures

FONT SEGMENT FRONT LOADING DEVICE

BACKGROUND OF THE INVENTION

Most manufacturers of phototypesetting machines place several fonts on one disc or film strip carrier with the entire disc or film strip being replaceable when it is desired to change fonts. It is known in the art that it is advantageous to separate a unitary disc into segments such as a number of pie-shaped disc portions so that each may be replaced on an individual basis upon the selection of a new font. Several manufacturers have employed such a segmental font system with the individual font segments being accurately located by expensive alignment pins and holes. However, since the mounting accuracy should be typically less than one mil, very little clearance exists between the holes and the guide pins which makes the segments difficult to replace and expensive to manufacture. Difficulty in replacement increases operator burdens and slows down such replacement.

It is highly desirable to effect rapid and easy insertion and removal of font segments from the front of the phototypesetter with a minimum of visual operator guidance, in contrast with the loading arrangement disclosed in patent application Ser. No. 747,761 filed Dec. 6, 1976 and assigned to the same assignee as the present invention.

SUMMARY OF THE INVENTION

In accoreance with an embodiment of the present invention, a plurality of outwardly and radially extending arms or support members are coupled to a central rotatable hub and a vertical reference shoulder portion is precision machined at outer portions of the support members so that upon rotation of the hub, centrifugal force is employed to accurately seat the segments against the shoulder portions. First and second sets of horizontally oriented retaining plates are affixed to the support members for supporting the segments against gravity and a stationary stage plate is positioned below the retaining plates for guiding the leading edge of the font segment and causing it to traverse a ramp member for positioning upon the rotatable retaining plates. This simple and highly reliable arrangement provides for extremely easy and rapid insertion and removal of the segment from the front of the phototypesetter.

Other objects, features and advantages will become apparent upon the perusal of the following detailed description taken in conjunction with the drawings in which.

DETAILED DESCRIPTION

Figure 2:
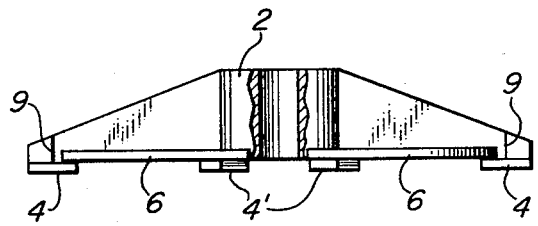
FIG. 2 illustrates a side view of the prior art assembly.

In accordance with the prior art, outwardly extending arms are provided, which are coupled to hub 2 and have outer portions which terminate in members 3 which have the above-mentioned vertically oriented reference shoulder portions machined in each member. Horizontal plates 4 are illustrated which support pie-shaped font segments 6 against gravity. The three degrees of translational freedom, $x$, $y$, and $z$, are illustrated by orthogonal vectors. Since the plane of the segments are perpendicular to the optical projection axis, character focus is affected only by $z$ variations. Since the depth of focus at the font plane is about plus or minus 5 mils, alignment accuracy in the $z$ axis is not critical. Alignment in the $y$ axis is a function of flash timing and is independent of font segment position since the clock track on the segments control flash timing. Thus, only alignment in the radial direction represented by the $x$ vector is critical. The above-mentioned vertically oriented reference shoulder portions 9, shown in FIG. 2, are formed by grinding, after the mounting of the assembly on the drive shaft 7, and may be readily controlled very accurately with respect to its radial position. This procedure minimizes any "radial run out" of the surface and establishes excellent radial alignment of the font segments. The retaining plates 4 are thereafter attached to create a land on which the font segments rest.

Font segments 6 are rapidly and easily placed upon the above-mentioned horizontally oriented support plates 4 as illustrated. Centrally located support plates 4' are coupled to the hub portion to fully support the font segments. Upon the rotation of hub 2, typically at a speed of 1800 rpm, centrifugal force causes the segments to be firmly seated against the inwardly facing vertically oriented precision machined shoulder portions 9 as illustrated in FIG. 2.

When it is desired to change a font segment, the machine is stopped and the segment is easily and rapidly lifted out of the assembly and a replacement segment is readily dropped into the assembly. The actual prior art prototype produced very accurate radial alignment of the font tracks and excellent results were obtained. This prototype employed an assembly having an overall diameter of 9 inches and which was rotated at a speed of 1800 rpm. Each segment was made of plexiglass and had an approximate weight of ⅛ pound.

Figure 1:
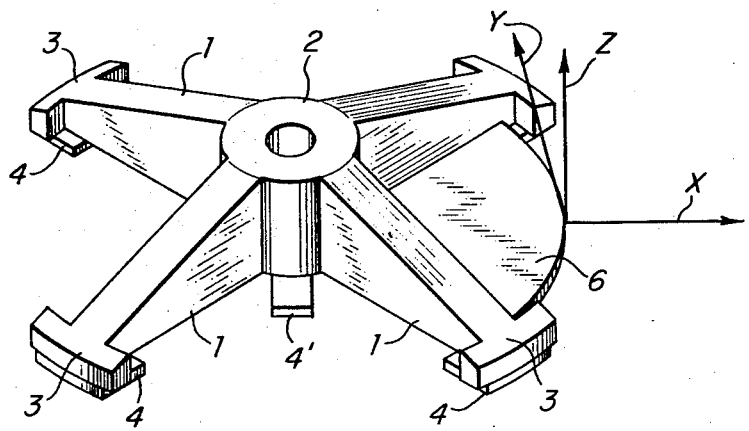
FIG. 1 illustrates an overall perspective view of a prior art assembly.
Figure 3:
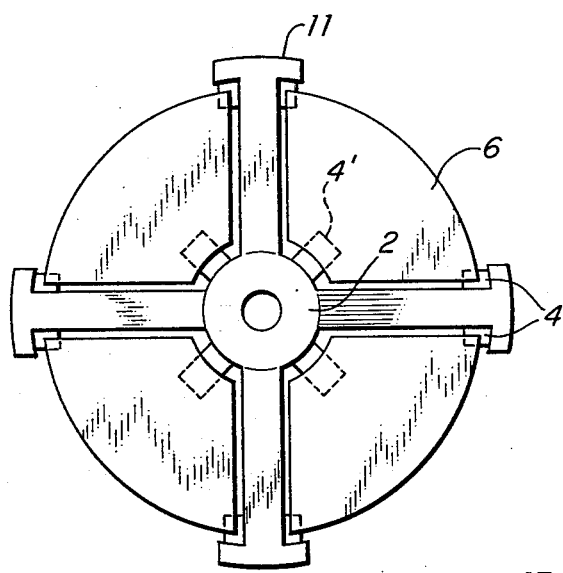
FIG. 3 illustrates a top view of FIG. 2 of the prior art.
Figure 4:
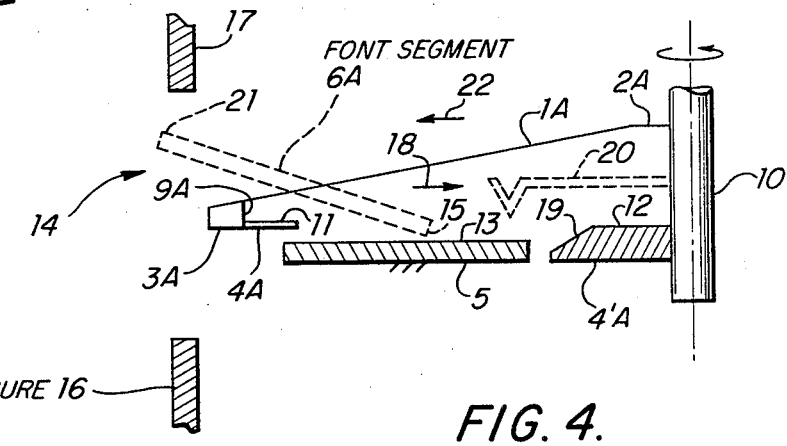
FIG. 4 illustrates a preferred embodiment of the present invention.

In FIG. 4, a preferred embodiment of the present invention is illustrated, employing similar numbers to represent similar parts of the structure described hereinabove in connection with the prior art font segment support device. A rotatable shaft 10 supports hub member 2a and outwardly extending arm 1a. A stationary stage plate 5 is affixed to the machine frame and is positioned adjacent a first horizontal segment support plate 4a attached to the outer portion 3a of arm 1a in the neighborhood of the vertical precision machined segment referencing wall or shoulder portion 9a. The upper surface 11 of horizontal support plate 4a lies in a first font segment support plane which also includes the upper surface 12 of the second segment support plate 4'a which is coupled to rotatable shaft 10. The upper surface 13 of stationary stage plate 5 lies in a second font segment support plane below the first font segment support plane including upper surfaces 11 and 12 of support members 4a and 4'a respectively. In the most preferred embodiment there are four members 4a and four members 4'a as in FIGS. 1-3. The assembly of FIG. 4 is positioned adjacent an opening 14 defined by enclosure members 16 and 17. Enclosure members 16 and 17 are vertically oriented so that opening 14 faces the operator seated in front of the phototypesetting machine. Preferably a door (not shown) is employed to close off the opening of the machine. Font segment 6a is easily and rapidly inserted into the machine by sliding the leading edge portion 17 along the upper surface 13 of stationary stage plate 5. The leading edge 17 as it continues in its forward motion represented by arrow 18 "rides up" ramp portion 19 of the support member 4'a and thereafter rests upon the upper surface 12 of member 4'a. After the segment 6a is fully inserted, trailing edge portion 21 of font segment 6a just clears horizontal support plate 11. The operator thereafter pulls the segment toward her in the direction of arrow 22 so that trailing edge 21 slides over upper surface 11 of outer support plate 4a and rests thereon. A second segment may thereafter be loaded if desired, by rotating arm 1a so that the next sector is positioned adjacent opening 14 and the above-mentioned process is repeated.

A segment is easily and rapidly removed from the phototypesetter by first pushing the segment forward in the direction of arrow 18 so that the trailing edge 21 clears plate 11 and rests upon stationary stage plate 5. The leading edge 17 of the segment at this time assumes the extreme innermost position upon the upper surface 12 of support plate 4'a. Segment 6a is thereafter pulled toward the operator in the direction of arrow 22 and the trailing edge 21 slides across the stationary stage plate 5 along its upper surface 13 and clears horizontal support plate 11 and is removed from the machine. Spring element 20 may be employed to bias segment 6a downwardly against upper surfaces 11 and 12 of the horizontal support plates.

Thus it should be appreciated that the present invention provides a simple and highly reliable device for easily and rapidly inserting and removing font segments to and from a rotatable font segment support device, from the front of the machine. The need for operator "eye balling" with respect to visual alignment is maintained at a minimum.

The ramp element 19 preferably is formed upon rotatable horizontal support plates 4'a, in the interest of simplicity and ease of manufacture. However, it is possible to form the ramp element upon the upper surface 13 of the stationary stage plate 5 or for that matter provide a separate ramp element if desired. While the stage plate may have numerous shapes, a pie-shaped plate is conducive to the above described design.

While preferred embodiments of the invention have been described, the teachings of this invention will readily suggest many other embodiments to those skilled in the art and thus the invention is to be limited only by the permissible scope of the following claims.

What is claimed is:

1. In a font support device for supporting font segments for a phototypesetting machine comprising:
   a. a rotatable hub member for supporting outwardly and radially extending segment support arms coupled to said hub member at positions so that adjacent support arms define a plurality of sectors for containing a plurality of font segments;
   b. vertically oriented inwardly facing precision machined font segment alignment reference shoulder portions formed upon outer portions of said arms for radially referencing said segments through the use of centrifugal force;
   c. first horizontal support means having upper surfaces positioned within a first font segment support plane and coupled to said outer portions of said arms for supporting said segments against gravity;
   d. second horizontal support means coupled to said hub member for supporting said segments against gravity, and having upper surfaces in substantially the same first font segment support plane as the upper surfaces of said first horizontal support means, the improvement comprising:
   e. a stationary stage plate having an upper surface thereof lying in a second font segment support plane below said first font segment support plane, for supporting said font segments during insertion and removal, together with guide means for guiding the leading edges of said font segments between contact with said stationary stage plate and contact with said second support means during insertion of said font segment into said font support device.

2. The combination as set forth in claim 1 wherein said guide means comprises a ramp element.

3. The combination as set forth in claim 2 wherein said ramp element is formed upon said second horizontal support means.

4. In a font support device for supporting font segments for a phototypesetting machine comprising:
   a. a rotatable hub member for supporting outwardly and radially extending segment support arms coupled to said hub member at positions so that adjacent support arms define a plurality of sectors for containing a plurality of font segments;
   b. first horizontal support means having upper surfaces positioned within a first font segment support plane and coupled to said outer portions of said arms for supporting said segments against gravity;
   c. second horizontal support means coupled to said hub member for supporting said segments against gravity, and having upper surfaces in substantially the same first font segment support plane as the upper surfaces of said first horizontal support means, the improvement comprising:
   d. a stationary stage plate having an upper surface thereof lying in a second font segment support plane below said first font segment support plane, for supporting said font segments during insertion and removal, together with guide means for guiding the leading edges of said font segments between contact with said stationary stage plate and contact with said second support means during insertion of said font segment into said font support device.

5. The combination as set forth in claim 4 wherein said guide means comprises a ramp element.

6. The combination as set forth in claim 5 wherein said ramp element is formed upon said second horizontal support means.

7. In a font support device for supporting font segments for a phototypesetting machine comprising:
   a. a rotatable hub member for supporting four outwardly and radially extending segment support arms coupled to said hub member at positions so that adjacent support arms define a plurality of sectors for containing a plurality of font segments;
   b. a first outer set of horizontal support plates having upper surfaces positioned within a first font segment support plane and coupled to said outer portions of each of said arms for supporting said segments against gravity;
   c. a second inner set of horizontal support plates coupled to said hub member for supporting said segments against gravity, and having upper surfaces in substantially the same first font segment support plane as the upper surfaces of said first set of support plates, the improvement comprising:
   d. a stationary stage plate having an upper surface thereof lying in a second font segment support plane below said first font segment support plane, for supporting said font segments during insertion and removal, together with guide means for guiding the leading edges of said font segments between contact with stationary stage plate and contact with a horizontal support plate of said second set of plates during insertion of said font segment into said font support device.

8. The combination as set forth in claim 7 wherein said guide means comprises a ramp element.

9. The combination as set forth in claim 8 wherein said ramp element is formed upon said second set of horizontal support plates.

10. In a font support device for supporting font segments for a phototypesetting machine comprising:
 a. a rotatable hub member for supporting four outwardly and radially extending segment support arms coupled to said hub member at positions so that adjacent support arms are perpendicular to each other to define four quadrants for containing four font segments;
 b. a first outer set of horizontal support plates having upper surfaces positioned within a first font segment support plane and coupled to said outer portions of each of said arms for supporting said segments against gravity;
 c. a second inner set of horizontal support plates coupled to said hub member for supporting said segments against gravity, and having upper surfaces in substantially the same first font segment support plane as the upper surfaces of said first set of support plates, the improvement comprising:
 d. a stationary stage plate having an upper surface thereof lying in a second font segment support plane below said first font segment support plane, for supporting said font segments during insertion and removal, together with guide means for guiding the leading edges of said font segments between contact with said stationary stage plate and contact with a horizontal support plate of said second set of plates during insertion of said font segment into said font support device.

11. The combination as set forth in claim 10 wherein said guide means comprises a ramp element.

12. The combination as set forth in claim 11 wherein said ramp element is formed upon said second set of horizontal support plates.

* * * * *